E. W. STOWE.
ROTARY GAS ENGINE.
APPLICATION FILED NOV. 11, 1919.
1,412,296.
Patented Apr. 11, 1922.
4 SHEETS—SHEET 1.
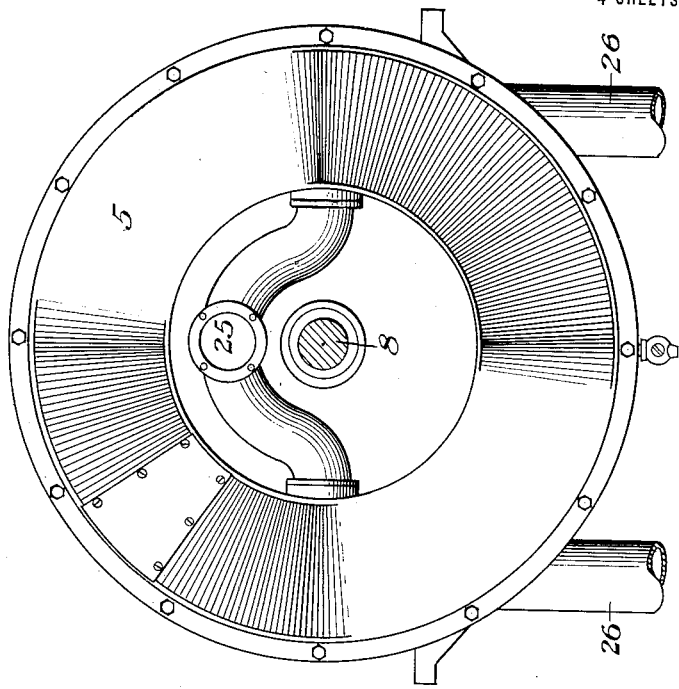
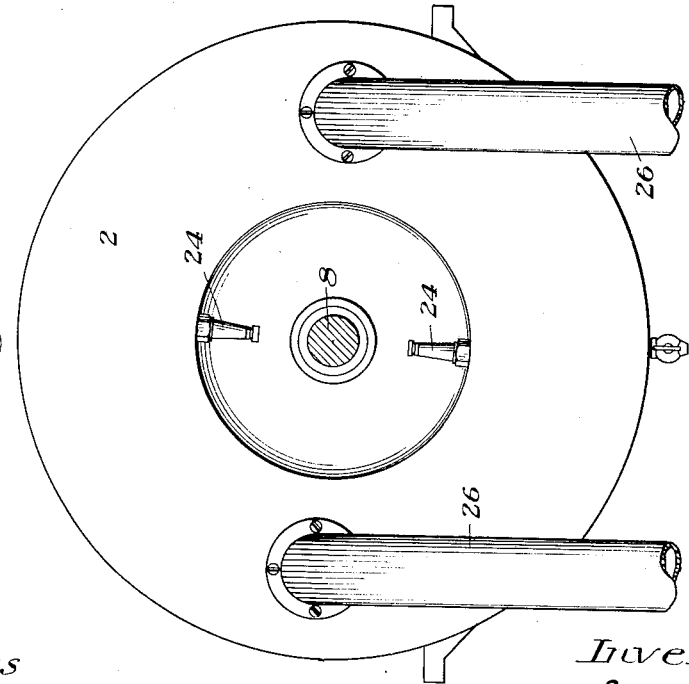

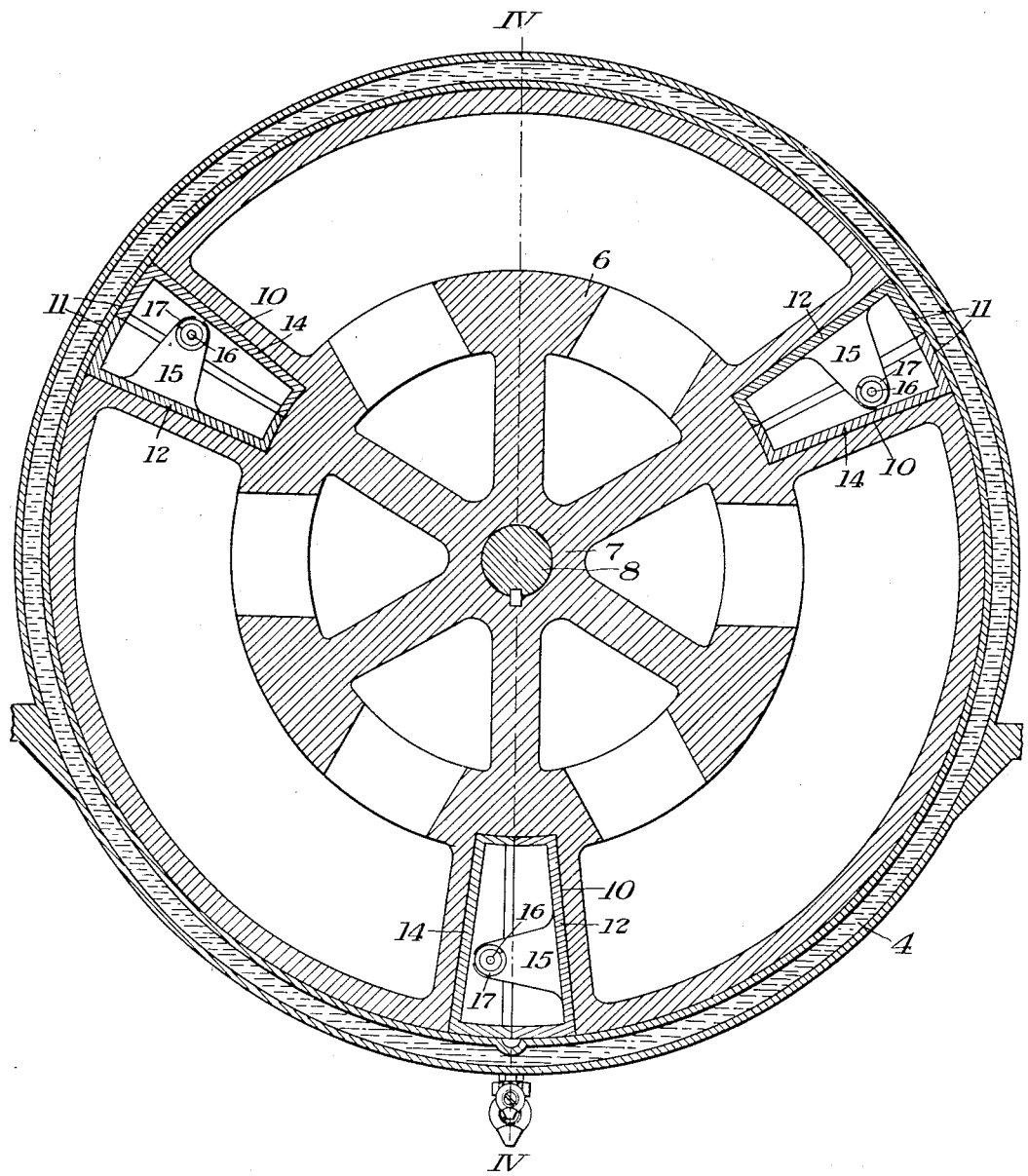

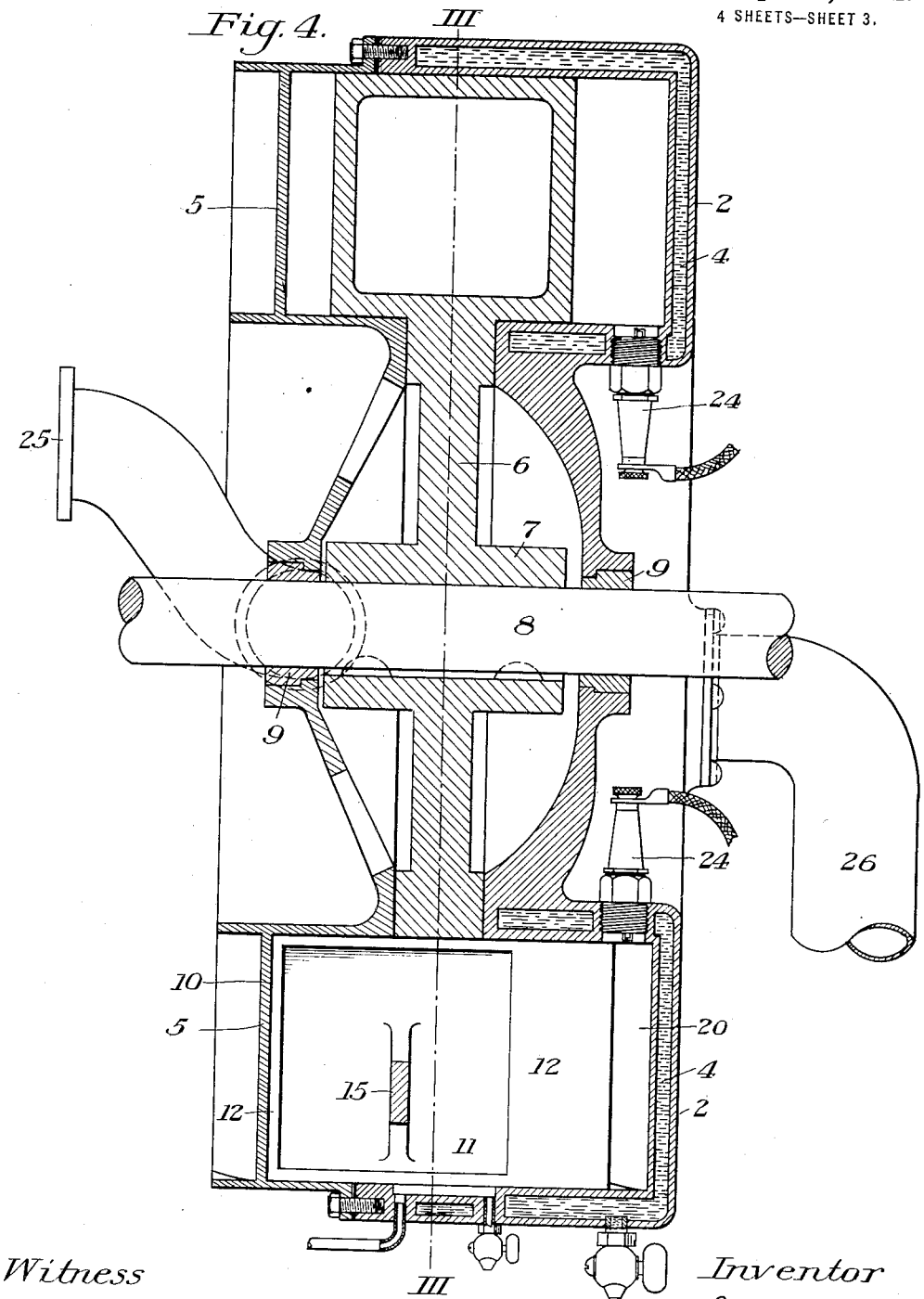

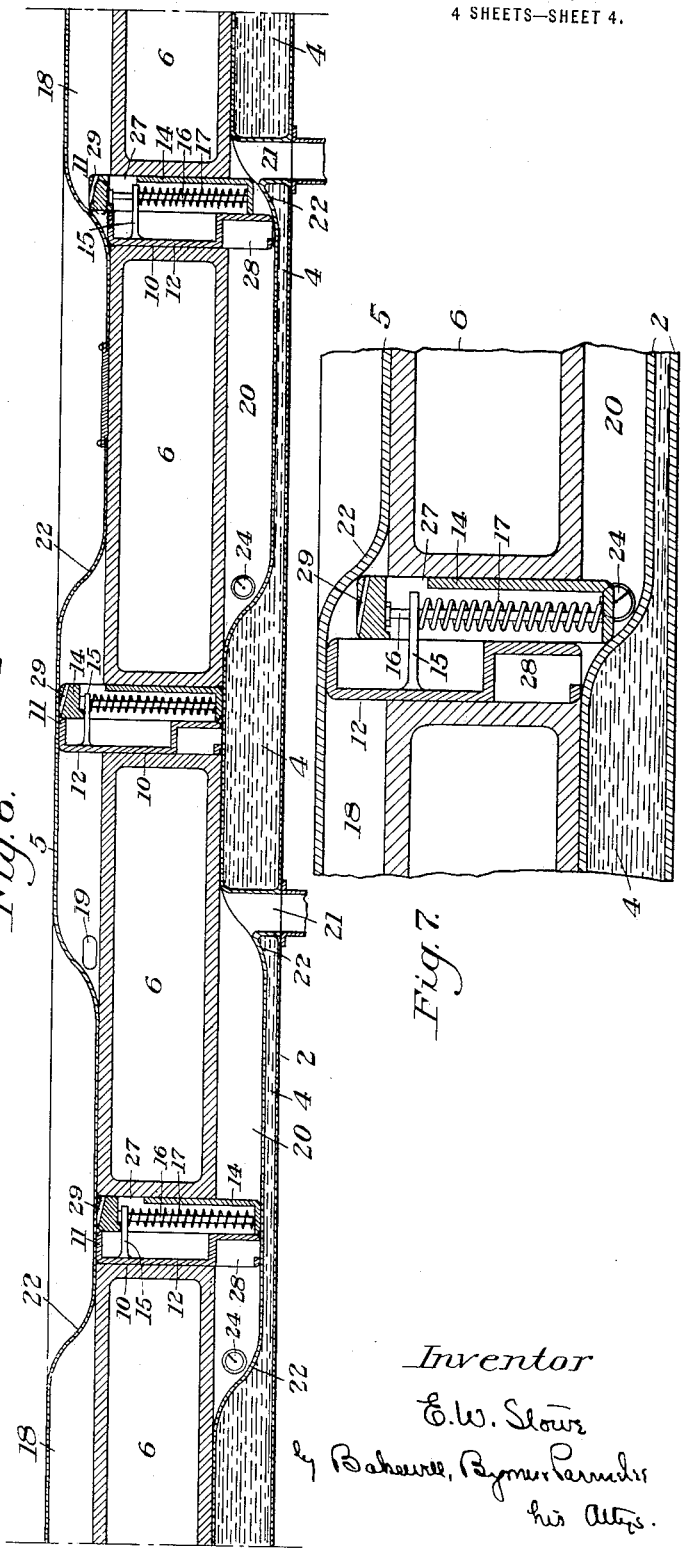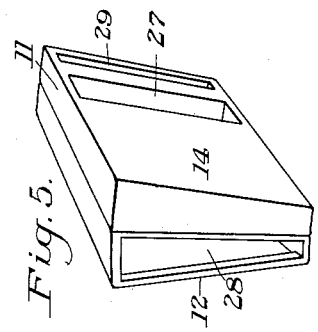

UNITED STATES PATENT OFFICE.

EDWIN W. STOWE, OF FAIR HAVEN, NEW JERSEY.

ROTARY GAS ENGINE.

1,412,296.         Specification of Letters Patent.    Patented Apr. 11, 1922.

Application filed November 11, 1919. Serial No. 337,205.

*To all whom it may concern:*

Be it known that I, EDWIN W. STOWE, a citizen of the United States, residing at Fair Haven, Monmouth County, New Jersey, have invented a new and useful Improvement in Rotary Gas Engines, of which the following is a full, clear, and exact description.

The present invention relates broadly to internal combustion engines, and more particularly to rotary engines of this type provided with sliding abutments.

The principal object of the present invention is to provide a rotary internal combustion engine having sliding abutments serving also as valves controlling the intake and exhaust of the explosive mixture and waste gases.

Another object of the invention is to provide a stationary casing having formed in one side thereof combined intake and compression chambers, and having formed in the other side thereof combined explosion and exhaust chambers.

A further object of the present invention it to provide a rotary gas engine having the combined intake and compression chambers alternating with the combined exhaust explosion and exhaust chambers.

A still further object of the present invention is to provide a novel type of casing having guides formed therein effecting operation of the valves and abutments as the rotor travels therein.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1 is a side view of the casing showing the exhaust connections;

Figure 2 is a side view of the opposite side of the casing showing the intake manifold;

Figure 3 is a longitudinal section on the line III—III of Figure 4;

Figure 4 is a transverse section on the line IV—IV of Figure 3;

Figure 5 is a perspective view of one of the combined valves and abutments;

Figure 6 is a development; and

Figure 7 is an enlarged view of a portion of the development of Figure 6 illustrating the operating of the combined valves and abutments.

Referring more particularly to the drawings, my improved rotary engine preferably comprises a front casing 2 constructed of double walls to provide a cooling jacket 4 for the combined explosion and exhaust chambers formed in this portion of the casing, as will be more fully described hereinafter.

A back casing 5 cooperates with the casings 2 to completely enclose the rotor 6 therebetween. In its preferred embodiment the rotor comprises a suitably constructed hub 7 keyed to the shaft 8 journaled in the bearings 9 formed in the front and back casings respectively. The rotor 6 is preferably provided with a series of equi-distant peripherally formed pockets 10 adapted to receive the combined valves and abutments 11. In the present drawings the rotor is illustrated as having but three pockets of this type, but it will be obvious that the number may be varied to suit the particular working conditions under which the engine operates.

Each of the combined valves and abutments 11 is preferably formed of hollow sections 12 and 14, the sections 12 preferably having formed therein bearings 15 projecting transversely of said sections and into the interior of the sections 14 where they cooperate with rods 16 forming guides for the compression springs 17. Due to this arrangement, it will be apparent that the springs 17 act at all times to force the sections 12 into contact with the back casing 5, and the sections 14 into engagement with the front casing 2. The bearing 15 forms the only connection between the sections of each of the valves, thereby permitting the effective operation of the springs 17.

For operating the combined sliding valves and abutments, I preferably form the interior of both of the casings of the motor with alternate projecting and receding portions, the projecting portions of each of the casings being opposite the receding portions of the other casings, and vice versa. As illustrated in the drawings, the receding portions 18 of the rear casing form combined intake and compression chambers adapted to receive a supply of combustible mixture through the intake openings 19. The recessed portions 20 of the front casings form combined explosion and exhaust chambers, each of these chambers being provided with exhaust openings 21. Due to this construction, it will be apparent that the combined intake and compression chambers 18 formed in the casings on one side of the rotor 6 alternate with the combined explosion and exhaust chambers 20 formed in the front casing on the opposite side of the rotor. As the ends of the valve sections are in engagement with the walls of the casings, these walls being relied upon to form guides for operating the valves, the projecting and receding portions of the casing are preferably joined by compound curved portions 22. Each of the combined explosion and exhaust chambers 20 is provided in the end thereof opposite the exhaust opening 21 with a suitable form of igniting device such as a spark plug 24 connected to any desired source of electric energy.

The intake openings 19 for the chambers 18 are connected with a suitable gas intake manifold 25, while the exhaust openings 21 for the chambers 20 may be connected to a similar exhaust manifold 26. In operation of the motor, upon rotation of the rotor 6, when one of the combined valves and abutments 11 passes beyond one of the intakes 19, it will form a partial vacuum in the chamber 18 tending to draw a supply of combustible mixture through the intake manifold 25 into said chamber. At the same time it will compress in front of the section 14 the supply of combustible mixture in the chamber 18 drawn thereinto by the operation of the preceding valve 11. This compressed combustible mixture will enter the hollow interior of the valve 11 through the opening 27 formed in the section 14 and will be held in this condition until the valve passes to the position illustrated in Figure 7, which will permit the escape of the compressed mixture into the chamber 20 through the opening 28 in the section 12. At this time, the valve will have passed one of the spark plugs 24 and the mixture will be exploded, thereby giving a power impulse which will carry the rotor 6 forward, permitting each of the valves 11 to successively operate in the manner just described. In order to prevent the pocketing of a small portion of the gas in the extreme end of each of the chambers 18 away from the intake 19, I preferably provide each of the valve sections 14 with a supplemental passage 29 through which all of the remaining combustible mixture may finally pass to the interior of the valve. Near the end of the power stroke, the valve sections will pass one of the exhaust openings 21 and the waste gases will be permitted to exhaust therethrough.

The advantages of the present invention reside in the simplicity of construction, employing a sectional casing having the combined intake and compression chambers formed on one side thereof, and the combined explosion and exhaust chambers formed on the opposite side thereof. Due to this arrangement, and due to the fact that these chambers are alternated, the strains incident to the operation of the motor are to a large extent eliminated, and the remaining strains are equalized so that a smooth operation of the rotor is insured.

I claim:

1. A rotary gas engine, comprising a stationary casing having a compression chamber in one side thereof and an explosion chamber in the opposite side thereof, a gas intake for said first mentioned chamber, a waste gas outlet for said second mentioned chamber, a rotor in said casing between said chambers, and valves in said casing movable transversely of the rotor and adapted to transfer a combustible mixture from the compression chamber on one side of said rotor to the explosion chamber on the other side of said rotor, substantially as described.

2. A rotary gas engine comprising a stationary casing having combined intake and compression chambers in one side thereof, combined explosion and exhaust chambers in the other side thereof, a gas intake for said first mentioned chambers and a waste gas outlet for said second mentioned chambers, a rotor in said casing, and sliding valve abutments carried by said rotor and moveable transversely of said rotor for transferring a combustible mixture from in front of said abutment on one side of said rotor to the rear of said abutment on the other side of said rotor, substantially as described.

3. A rotary gas engine comprising a stationary casing having a compression chamber in one side thereof, an explosion chamber in the opposite side thereof, a waste gas outlet for said second mentioned chamber, a rotor in said casing, and sliding two-part abutments carried by said rotor and engaging said casing and movable by said casing transversely of said rotor for transferring a combustible mixture from said compression chamber to the explosion chamber on the other side of said rotor, substantially as described.

4. A rotary gas engine, comprising a stationary casing having a compression chamber in one side thereof and an explosion chamber in the opposite side thereof, a gas intake for said compression chamber, a waste gas outlet for said explosion chamber, a rotor in said casing, sectional valve abutments carried by said rotor and engaging said casing, the sections of said abutments being movable with respect to each other and transversely of said rotor and provided with an interior chamber communicating alternately with the compression chamber and the explosion chamber and movable transversely of said rotor by engagement with said casing, substantially as described.

5. A rotary gas engine, comprising a stationary casing having combined intake and compression chambers in one side thereof and combined explosion and exhaust chambers in the opposite side thereof, said chambers having intake and exhaust openings, respectively, communicating therewith, a rotor in said casing between said sets of chambers, sliding abutments carried by said rotor and moved by said casing to alternately project into one set of said chambers and then into the other set, the walls of said casing forming guides for actuating said abutments, and valves in said abutments whereby a combustible mixture is automatically transferred from one set of chambers to the other, substantially as described.

6. In a rotary engine, a front casing, a rear casing, said casings having alternate projections and reentrant portions formed therein and forming compression chambers in one of said casings and explosion chambers in the other of said casings, curved portions connecting said projecting and reentrant portions to form guides, a rotor in said casings between said chambers, and sliding valve abutments carried by said rotor and moved transversely of said rotor by said guides, said abutments having relatively movable members having an interior chamber communicating with the compression chamber and with the explosion chamber alternately, the communication with said chambers being controlled automatically upon the movement of said abutments, substantially as described.

7. A rotary engine, comprising a stationary casing having compression chambers only in one side thereof and explosion chambers only in the opposite side thereof, a gas intake for said first mentioned chambers, a waste gas outlet for said second mentioned chambers, a rotor in said casing, and sectional abutments in said rotor and having an interior passage, the said sections being movable with respect to each other and with respect to said rotor and acting to transfer the combustible mixture from the compression chambers on one side of the rotor to the explosion chambers on the opposite side of the rotor by automatic communication between said chambers and interior passage alternately as said sections are moved relative to each other and to said rotor, substantially as described.

8. A rotary gas engine comprising a stationary casing having compression chambers only in one side thereof and explosion chambers only in the opposite side thereof, means for supplying a combustible mixture to said first mentioned chambers, means for permitting the escape of waste gases from said second mentioned chambers, a rotor in said casing between said chambers, sectional sliding abutments carried by said rotor, said sections being movable relative to each other, and actuated by engagement with said casing, said abutments extending into the compression chambers and acting to compress the combustible mixture therein and transfer said compressed combustible mixture into the explosion chamber on the opposite side of said rotor when moved from said compression chambers to said combustion chambers, substantially as described.

9. A rotary gas engine comprising a rotor, a casing enclosing the same, said casing having compression chambers on one side of the rotor and explosion chambers on the opposite side of the rotor, means for supplying a combustible mixture to said first mentioned chambers, means for permitting the exhaust of waste gases from said second mentioned chambers, sectional abutments carried by the rotor and engaging said casing and adapted to be moved transversely of the rotor as the abutments pass from one set of chambers to the other, means on the casing for moving said abutments transversely of said rotor and for moving the sections with respect to each other, said sections having chambers therein communicating with the compression chamber when said abutments extend thereinto and communicating with said explosion chamber when said abutments are moved from said compression chambers to said explosion chambers, and means for igniting said combustible mixture in said explosion chambers, substantially as described.

10. A rotary gas engine, comprising a stationary cylinder-shaped casing, the two interior ends of which have depressed portions forming compression chambers in the one end and explosion chambers in the other end, the depressions in one end being offset with respect to the depressions in the other end and alternating therewith, ah explosive mixture intake for the first mentioned chambers and a waste outlet for the second mentioned chambers, a shaft through the center of the circumference of said casing, a rotor attached thereto revolving within the casing and in contact with substantially the entire circumference thereof, a plurality of notches in said rotor extending from side to side and equidistant around the circumference thereof, and containing sliding hollow valve abutments provided with openings at each end to allow the passage of compressed explosive mixture therethrough from the compression chambers to the explosion chambers, said sliding valve abutments being made in two parts forced in opposite directions and moved transversely of said rotor during its revolution by the end walls of said casing with which they are in contact, means for closing the end of said sliding valve abutments on the compression chamber side and opening the end on the explosive chamber side and vice versa, substantially as described.

11. In a rotary gas engine, a rotor comprising a main portion having a plurality of radial pockets formed in the periphery thereof, sliding abutments mounted in said pockets, said abutments comprising two members movable with respect to each other and transversely of the plane of rotation of said rotor, a casing having guides therein in which said abutments slide and means normally tending to separate said sections substantially as described.

12. In a rotary gas engine, a rotor comprising a main body portion having a plurality of radial slots formed in the periphery thereof, sliding sectional abutments loosely mounted in said pockets, a casing having guides therein in which said abutments slide means normally tending to move the sections of said abutments out of line with each other, and an interior passage between said sections which is open to the exterior when said sections are in alignment and extend on one side of said rotor and which is closed to the exterior when said sections are aligned and extend on the other side of said rotor, substantially as described.

13. A sectional abutment for rotary gas engines, comprising co-operating sections of substantially equal length, a spring normally tending to hold said sections out of register longitudinally, said sections being hollow and relatively movable longitudinally with respect to each other to make and close a passage therethrough, the passage through said sections being open when said spring is under compression and said sections are out of register with each other and closed when said sections are in register, substantially as described.

In testimony whereof, I have hereunto set my hand.

EDWIN W. STOWE.